June 24, 1924.
L. F. MALOUIN
SHOCK ABSORBER
Filed July 6, 1923
1,498,880
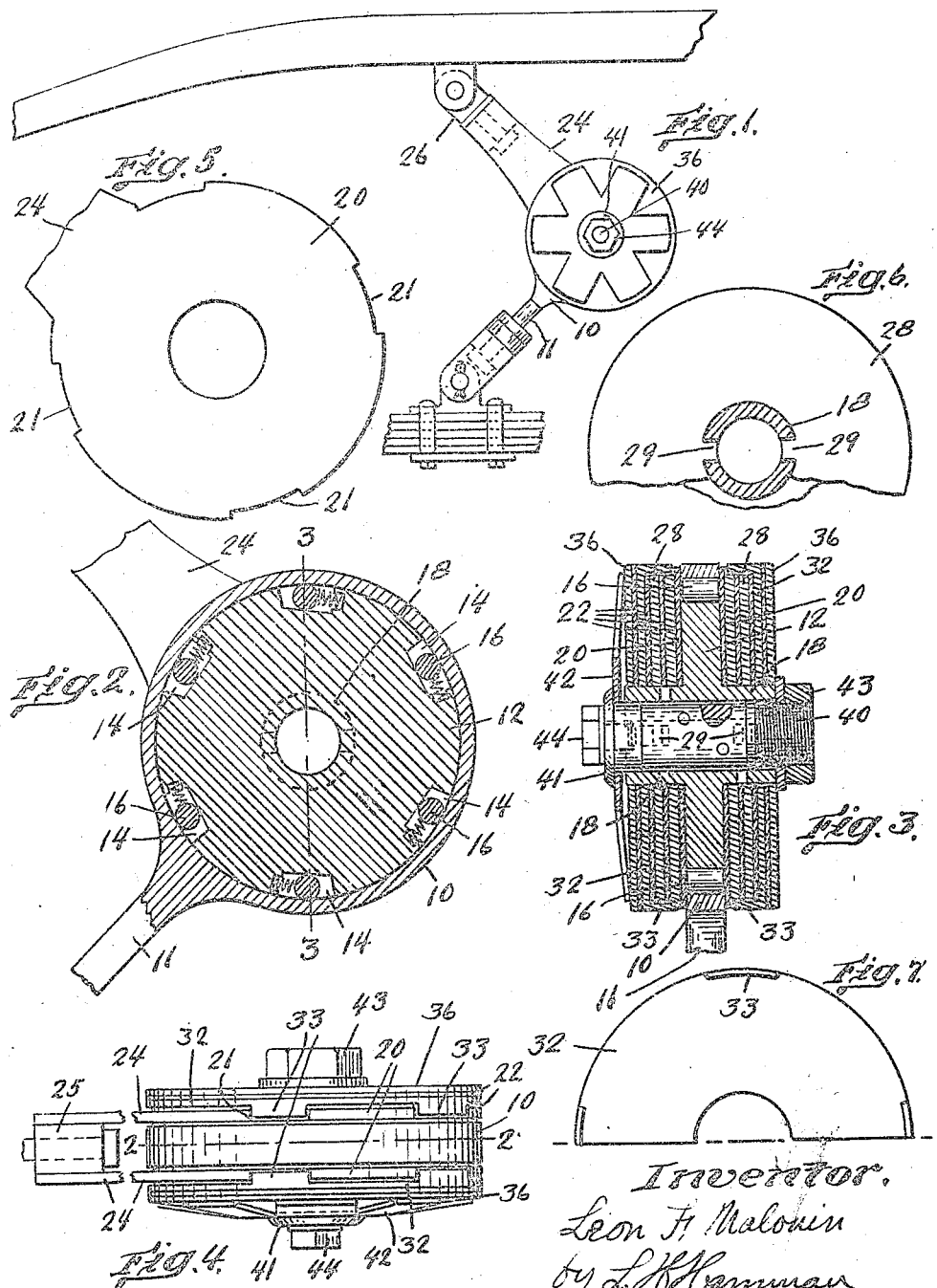
Inventor.
Leon F. Malouin
by L. H. Hamman
Atty.

Patented June 24, 1924.

1,498,880

UNITED STATES PATENT OFFICE.

LEON F. MALOUIN, OF CLAREMONT, NEW HAMPSHIRE.

SHOCK ABSORBER.

Application filed July 6, 1923. Serial No. 649,814.

*To all whom it may concern:*

Be it known that I, LEON F. MALOUIN, a citizen of the United States, a resident of Claremont, in Sullivan County and State of New Hampshire, have invented an Improvement in Shock Absorbers, of which the following is a specification.

This invention relates to that type of shock absorber for vehicles in which a comparatively free movement is permitted in one direction, and the movement in the other direction is retarded, such devices being sometimes known as "jump preventors", as they are used to prevent the supported body from being thrown violently upward by the recoil of the springs. More specifically the invention relates to that class of devices in which the two members of the device have interposed friction disks for retarding relative movement in one direction and a friction clutch device which permits relatively free movement in the opposite direction.

The primary objects of my invention provide an improved and simple arrangement of the friction clutch and disk devices which will permit economical manufacturing expense and will readily enable the employment of as many friction disks as may be considered desirable.

I accomplish these objects by the means shown in the accompanying drawing in which:—

Fig. 1 is a side elevation showing the application of a device embodying my invention to a vehicle.

Fig. 2 is a sectional view at line 2—2 of Fig. 4.

Fig. 3 is a sectional view at line 3—3 of Fig. 2.

Fig. 4 is a plan view.

Figs. 5, 6 and 7 are detail views of certain friction members which I employ.

As shown in the drawing, the device comprises an outer clutch member 10, having an arm 11 integral therewith, which is adapted to be pivotally connected to the vehicle axle and an inner clutch member 12, said member 10 being constructed in the form of a ring and said member 12 in the form of a flat disk which is rotatable within the ring 10, and fits the inner periphery thereof. Said ring and disk are of the same thickness and the disk has a series of peripheral chambers 14, in which a corresponding series of clutch rolls 16 are located, said rolls being spring pressed into contact with the inner periphery of the ring 10 and being adapted to become wedged between the same and the bottom of the chambers to prevent relative rotation of the members in one direction and to permit such rotation in the oppposite direction, in a well known manner. The clutch member or disk 12 is integrally formed with, or rigidly secured to a hollow hub or sleeve 18 which projects from each side thereof, and a pair of iron or steel friction plates 20 are rotatably mounted on said hub at opposite sides of the disk 12.

Arms 24 are formed integrally with the plates 20, said arms being rigidly connected, or welded to opposite sides of an interposed block 25, in which an ear 26 is swiveled, said ear being adapted for connection with the vehicle body as indicated in Fig. 1. A pair of iron friction disks 28 are arranged on the hub 18 at opposite sides of the plate 20 from disk 12 and are held from rotation relatively to the hub by means of lugs 29 thereon which extend into longitudinal slots formed in the end portions of the hub, as indicated in Fig. 6 and in dotted lines in Fig. 3. Iron friction plates 32 are mounted on the hub 18 at opposite sides of the disks 28 from their adjacent sides, and are provided with integral lugs 33 which extend oppositely at right angles thereto and engage the plates 20 in notches 21 formed in the peripheral edge portions thereof, so that rotation of the plates 20 will cause corresponding movement of the disks 32. Sheet iron or steel friction disks 36 are arranged on the oposite ends of the hub 18 and are held from rotation relatively thereto in the same manner as are the disks 28.

To avoid the undesirable effects which are likely to be caused by the rubbing, or friction action of iron on iron, brass washers 22 are preferably placed on the hub 18 between the disk 12 and plates 20, between the plates 20 and disks 28, between plates 32 and disks 28, and between the plates 32 and disks 36. A bolt 40 is extended through the hub 18 and a head 41 on one end thereof is arranged to hold a spring washer 42 against one of the outer disks 36, a nut 43 being threaded on the opposite end of the bolt in engagement with the other outer disk, so that all of said disks and plates may be pressed together by a yielding force and the extent of frictional engagement thereof may be adjusted by means of said nut.

With the above described construction, when the arms 11 and 24 are swung towards each other, as when the vehicle body moves down against the action of its supporting springs, the outer clutch member or ring 10 will merely slide about on the inner clutch member, or disk 12, the other parts remaining stationary with relation to the latter. On the return movement, said members will clutch, so that they will rotate together, thereby causing rotation of the sleeve, or hub 18, and with it the friction disks 28 and 36. As the intervening plates 20 and 32 are positively connected with the arms 24, they will be held stationary relatively to the inner clutch member or disks 28 and 36, so that the return swinging movement of said arms 11 and 24, as they swing away from each other, will be retarded by the frictional engagement of said disks as they are turned on said plates. The extent to which this movement is retarded will depend on the force with which the frictional surfaces are pressed together, this force being determined by the position of the nut 43, as previously stated. In this connection is to be noted that the transversely projecting lugs 33 are adapted to slide in the peripheral notches of the friction plates 20 and that the inwardly extending lugs 29 on the friction disks 28 and 36 are adapted to move in the longitudinally extending slots of the hub, so that free transverse movement of the disks and plates is permitted when the nut 43 is tightened or loosened.

The bolt 40 may be provided with a central bore from one end to receive a lubricant, the chamber thus provided being closed by a screw plug 44, and lubricating passages being provided in the bolt and hub, so that the frictional surfaces may be kept lubricated.

While two bars of iron or steel friction plates and disks are shown as provided at each side of the clutch member, it will be apparent that a less or greater number than that shown may be employed, the extent to which the number may be increased being indefinite.

I claim:—

1. In a shock absorber for vehicles, a clutch comprising a ring member adapted to be attached to one of two relatively moving parts of a vehicle, a disk member arranged within said ring member, clutching devices intermediate said members permitting free relative rotatable movement thereof in one direction, a hub rigid with said disk member and projecting at each side thereof, a friction plate mounted on said hub at each side of said disk member and having means for attachment thereof to the other moving part of the vehicle, a friction disk mounted on the hub at the opposite sides of each plate from said disk member and having means to prevent relative rotation thereof and the hub and means to hold the adjacent surfaces of said friction disks, plates and disk member in frictional engagement.

2. In a shock absorber for vehicles, a clutch comprising a ring member adapted to be attached to one of two relatively moving parts of a vehicle, a disk member arranged within said ring member, clutching devices intermediate said members permitting free relative rotatable movement thereof in one direction, a hub rigid with said disk member and projecting from each side thereof, a pair of friction plates mounted on said hub at each side of said disk member, transversely extending means connecting each pair of plates, an arm rigid with a plate of each pair and having means for attachment with the other moving part of the vehicle, a pair of friction disks mounted on the hub one between each pair of said friction plates and held against rotation relative to the hub and means to hold said plates and disks in frictional engagement.

3. In a shock absorber for vehicles, a clutch comprising a ring member adapted to be attached to one of two relatively moving parts of a vehicle, a disk member arranged within said ring member, clutching devices intermediate said members permitting free relative rotatable movement thereof in one direction, a hub rigid with said disk member and projecting therefrom at each side thereof, a series of friction plates and friction disks alternately arranged on said hub at each side of said disk member, said friction plates being connected to each other independently of said disks and arranged for connection with the other moving part of the vehicle, means to connect said friction disks to said hub and means to hold said plates and disks in frictional engagement.

4. In a shock absorber for vehicles, a clutch comprising a ring member adapted to be attached to one of two relatively moving parts of a vehicle, a disk member arranged within said ring member, clutching devices intermediate said members permitting free relative rotatable movement thereof in one direction, a hub projecting from said disk member and rigid therewith, a series of friction plates and friction disks alternately arranged on said hub, means to connect said plates with each other and with the other moving part of the vehicle to cause simultaneous rotation of said plates on the hub, means to connect said friction disks to said disk member through the hub and means to hold said disks and plates in frictional engagement.

5. In a shock absorber for vehicles, a disk member arranged for connection with one of two relatively moving parts of a vehicle, and having a hub rigid therewith and projecting from opposite sides thereof, two pairs of friction plates arranged on said hub, one pair at each side of said disk member, means to connect one plate of each pair to the other of said vehicle parts, transversely extending lugs on one plate of each pair arranged to engage the corresponding plate of the pair to hold said plates against relative rotary movement, friction disks disposed on the hub, one between each pair of plates and having means to engage the hub to prevent rotation relative thereto, and means to press said plates into frictional engagement.

6. In a shock absorber for vehicles, a disk member arranged for connection with one of two relatively moving parts of a vehicle, and having a hub rigid therewith and projecting from opposite sides thereof, two pairs of friction plates arranged on said hub, one pair at each side of said disk member, means to connect one plate of each pair to the other of said vehicle parts, a transversely slidable connection between each pair of plates to hold them against relative rotary movement, a friction disk disposed on the hub between each plate and having connecting means with the hub preventing rotary movement and permitting longitudinal movement relative to the hub and adjustable means at the opposite ends of the hub for pressing said disks and plates into frictional engagement.

In testimony wherof, I have signed my name to this specification.

LEON F. MALOUIN.